(12) United States Patent
Kim et al.

(10) Patent No.: US 12,431,577 B2
(45) Date of Patent: Sep. 30, 2025

(54) BATTERY MODULE AND BATTERY PACK INCLUDING THE SAME

(71) Applicant: LG ENERGY SOLUTION, LTD., Seoul (KR)

(72) Inventors: Min Seop Kim, Daejeon (KR); Junyeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 847 days.

(21) Appl. No.: 17/677,896

(22) Filed: Feb. 22, 2022

(65) Prior Publication Data

US 2022/0271384 A1     Aug. 25, 2022

(30) Foreign Application Priority Data

Feb. 24, 2021   (KR) ........................ 10-2021-0024697

(51) Int. Cl.
*H01M 50/264* (2021.01)
*H01M 50/211* (2021.01)
*H01M 50/271* (2021.01)

(52) U.S. Cl.
CPC ....... *H01M 50/264* (2021.01); *H01M 50/211* (2021.01); *H01M 50/271* (2021.01)

(58) Field of Classification Search
CPC . H01M 50/264; H01M 50/211; H01M 50/271
See application file for complete search history.

(56) References Cited

U.S. PATENT DOCUMENTS

| | | |
|---|---|---|
| 2003/0211382 A1 | 11/2003 | Aoyama |
| 2014/0220412 A1 | 8/2014 | Lee et al. |
| 2014/0295235 A1 | 10/2014 | Jung |
| 2018/0047954 A1 | 2/2018 | Yoo et al. |
| 2019/0198952 A1 | 6/2019 | Choi et al. |
| 2022/0131225 A1 | 4/2022 | Baek et al. |

FOREIGN PATENT DOCUMENTS

| | | |
|---|---|---|
| CN | 210640300 U | 5/2020 |
| KR | 2003-0074167 A | 9/2003 |
| KR | 10-2014-0099397 A | 8/2014 |
| KR | 10-1430620 B1 | 8/2014 |
| KR | 10-2014-0118734 A | 10/2014 |
| KR | 10-2016-0148398 A | 12/2016 |
| KR | 10-2019-0078521 A | 7/2019 |
| KR | 10-2019-0112465 A | 10/2019 |
| KR | 10-2019-0138072 A | 12/2019 |
| KR | 10-2021-0010239 A | 7/2021 |

*Primary Examiner* — Sarah A. Slifka
(74) *Attorney, Agent, or Firm* — Bryan Cave Leighton Paisner LLP (57) ABSTRACT

A battery module including: a cell assembly including a battery cell stack containing a plurality of battery cells; a housing surrounding the cell assembly; and an end plate covering front and rear surfaces of the cell assembly that are present at an opening of the housing. The housing includes a frame member covering a lower portion and side portions of the cell assembly, an upper plate covering an upper portion of the cell assembly, and first and second fixing portions. The first and second fixing portions have different coupling shapes, and are formed along the edges of the upper plate that is coupled with the frame member.

15 Claims, 9 Drawing Sheets

FIG. 1

Prior Art

BATTERY MODULE AND BATTERY PACK INCLUDING THE SAME

CROSS-REFERENCE TO RELATED APPLICATION

This application claims priority to and the benefit of Korean Patent Application No. 10-2021-0024697 filed in the Korean Intellectual Property Office on Feb. 24, 2021, the entire contents of which are incorporated herein by reference.

FIELD

The present invention relates to a battery module and a battery pack including the same. More particularly, the present invention relates to a battery module with improved assembly and productivity, and a battery pack including the same.

BACKGROUND

As technology develops and demand for mobile devices increases, the demand for rechargeable batteries as an energy source is rapidly increasing. In particular, rechargeable batteries are of great interest not only for mobile devices such as mobile phones, digital cameras, laptops, and wearable devices, but also as energy sources for power devices such as electric bicycles, electric vehicles, and hybrid electric vehicles.

Recently, as the need for a large capacity rechargeable battery structure, including the use of rechargeable batteries as an energy storage source, increases, the demand for a battery pack with a multi-module structure in which a plurality of rechargeable batteries are assembled in series/coupled in parallel is increasing.

Meanwhile, in general, when a battery pack is formed by a plurality of battery cells in series/coupled in parallel, a battery module including at least one battery cell is formed, and the at least one battery module is used to add other constituent elements to the battery.

The battery module includes a battery cell stack in which a plurality of battery cells are stacked, and a housing for the battery cell stack.

Figure 1:
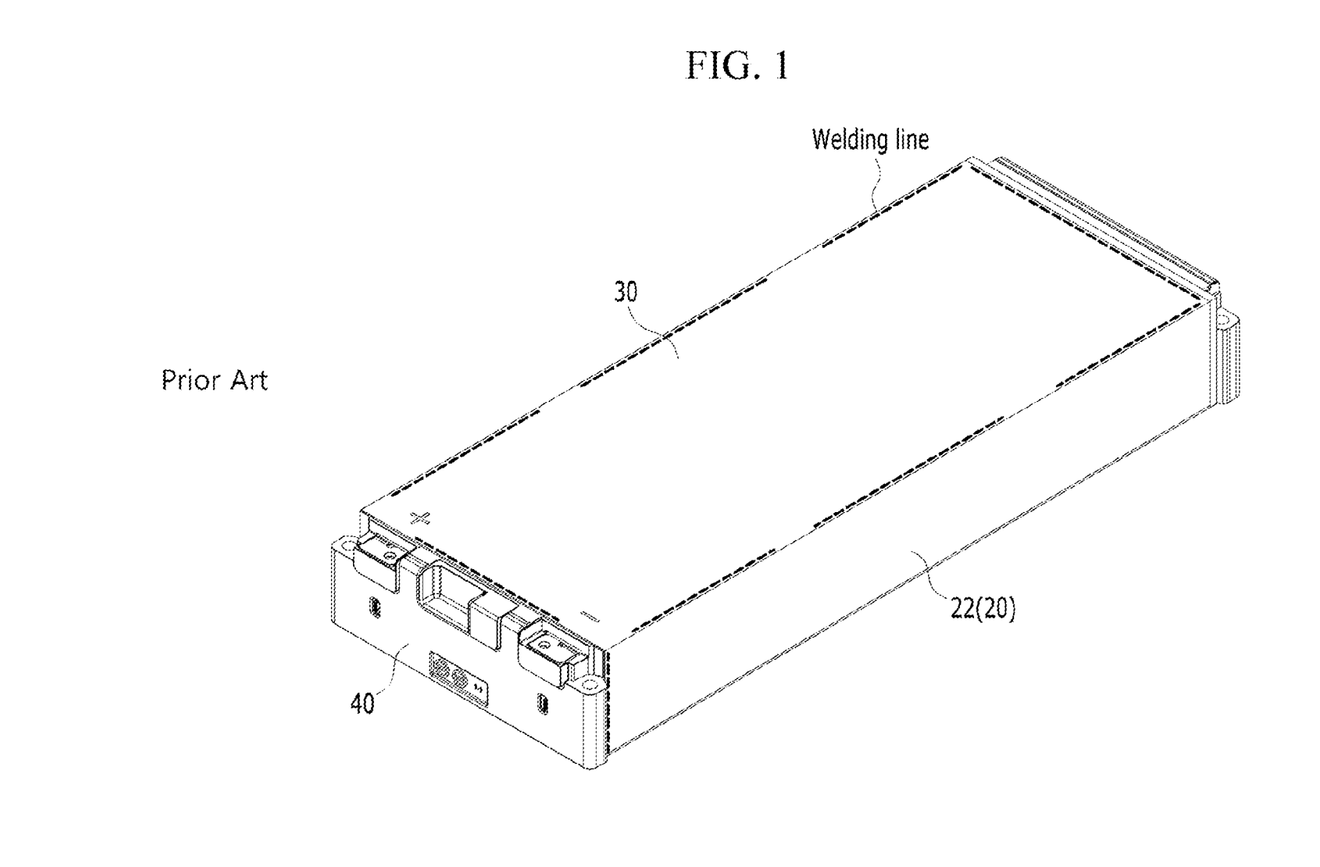
FIG. 1 is a perspective view of a conventional battery module.

FIG. 1 is a perspective view of a conventional battery module. As illustrated in FIG. 1, a conventional battery module 10 may be formed of a U-shaped housing 20 that accommodates a battery cell stack where a plurality of battery cells are stacked, an upper plate 30 that covers a top surface of the battery cell stack, and an end plate 40 that covers front and rear surfaces of the battery cell stack. The U-shaped housing 20 may include a bottom portion and side portions 22.

Welding is carried out for assembly of the battery housing, and as illustrated in FIG. 1, the end plate 40 and the U-shaped housing 20 are welded, and the end plate 40 and the upper plate 30 are welded, and simultaneously, welding can be performed between the top surface of the side portion 22 and the edges of the upper plate 30 of the U-shaped housing 20.

This creates many weld lines between frame structures, which increases the difficulty of the welding process. In particular, an area of the battery module in which the number of battery cells stacked in a battery cell stack increases significantly compared to the prior art, the difficulty of assembly and welding may increase as the tolerance of the frame structure increases with increasing size of the housing. Therefore, for a large area battery module, there is a need for a structure to improve the assembly of the battery module along with welding.

The above information disclosed in this Background section is only to enhance understanding the background of the invention, and therefore it may contain information that does not form the prior art that is already known in this country to a person of ordinary skill in the art.

SUMMARY

A problem to be solved by the present invention is to provide a battery module with improved assembly and productivity between battery housings.

The problem to be solved by the present invention is not limited to the above-mentioned problem, and problems not mentioned can be clearly understood by a person of an ordinary skill in the technical field to which the present invention belongs from this specification and the attached drawing.

A battery module according to an exemplary embodiment of the present invention includes: a cell assembly including a battery cell stack in which a plurality of battery cells are stacked; a housing that surrounds the cell assembly; and an end plate that covers front and rear surfaces of the cell assembly, and located in an opening of the housing, wherein the housing includes a frame member covering a lower side and sides of the cell assembly, an upper plate covering an upper surface of the cell assembly, and a first fixing portion and a second fixing portion, each having a different coupling shape, formed at the edges of the upper plate that is coupled with the frame member.

The first fixing portion may be a welding portion, and the second fixing portion may be in the form of a hook or a screw.

The second fixing portion may include a protruding portion, the protruding portion is coupled to a hole formed in the frame member, and a plurality of the second fixing portions are provided, which are spaced apart from each other at the edges of the upper plate.

The frame member may include a bottom portion that supports a lower portion of the cell assembly and side portions that extend upward from opposite ends of the bottom portion, the upper plate may further include a fixing cover that extends from an edge of the upper plate and covers an upper end of each of the side portions, and the protruding portion may be formed at an end of the fixing cover.

The protruding portion may have a truncated shape with a bottom surface in contact with the end of the fixing cover.

The protruding portion may have a quadrangular truncated shape with a trapezoid surface when viewed from a direction vertical to the end of the fixing cover.

The bottom surface of the protruding portion, which is a surface of the protruding portion in contact with the end of the fixing cover, may be formed in the shape of a quadrangle.

The hole may be formed with the same size and shape as the bottom surface of the protruding portion, which is the surface of the protruding portion in contact with the end of the fixing cover, and the protruding portion may be fixed by fitting it into the hole.

A groove portion may be formed at an edge of the upper plate, and the side portion is inserted into the groove portion.

The second fixing portion may include a screw nut portion and a screw portion fixed to the screw nut portion, and a plurality of second fixing portions may be provided, which are spaced apart from each other at an edge of the upper plate.

The frame member may include a bottom portion supporting the lower portion of the cell assembly, and side portions extending upward from opposite ends of the bottom portion. The upper plate may further include a fixing cover extending from one edge of the upper plate to cover the top of the side portion. The screw nut portion may be formed in the fixing cover and the side portion, and the second fixing portion may be coupled with the side portion through the fixing cover.

The screw portion may be fixed by fitting it into the screw nut portion.

The first fixing portion may be formed between the plurality of second fixing portions.

The end plate and the housing and the end plate and the upper plate may be respectively coupled by welding.

A battery pack according to another exemplary embodiment of the present invention may include the battery module.

The battery module according to an exemplary embodiment of the present invention improves assembly and productivity by forming a fixing portion on the edge of the upper plate.

In particular, when the area of a battery module, in which the number of battery cells stacked in the battery cell stack increases significantly compared to the prior art, the welding difficulty increases as the tolerance increases, and thus improvement in assembly and productivity can be improved by forming the fixing portion.

The objective of the present invention is not limited to the above-mentioned objectives, and objectives not mentioned will be clearly understood by a person of an ordinary skill in the technical field to which the present invention belongs from this specification and the accompanying drawings.

DETAILED DESCRIPTION

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

The drawings and description are to be regarded as illustrative in nature and not restrictive. Like reference numerals designate like elements throughout the specification.

In addition, since the size and thickness of each configuration shown in the drawings are arbitrarily indicated for better understanding and ease of description, the present invention is not necessarily limited to the drawings. In the drawings, the thickness of layers, films, panels, regions, etc., are exaggerated for clarity. In addition, in the drawings, the thickness of some layers and regions is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

In addition, unless explicitly described to the contrary, the word "comprise", and variations such as "comprises" or "comprising", will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

The terms first and second used in this application may be used to describe various configurations and elements, but constituent elements should not be limited by the terms. The terms are used only for the purpose of distinguishing one constituent element from other constituent elements.

Hereinafter, a battery module including a first fixing portion and a second fixing portion according to an exemplary embodiment of the present invention will be described with reference to FIG. 2 to FIG. 7.

Figure 2:
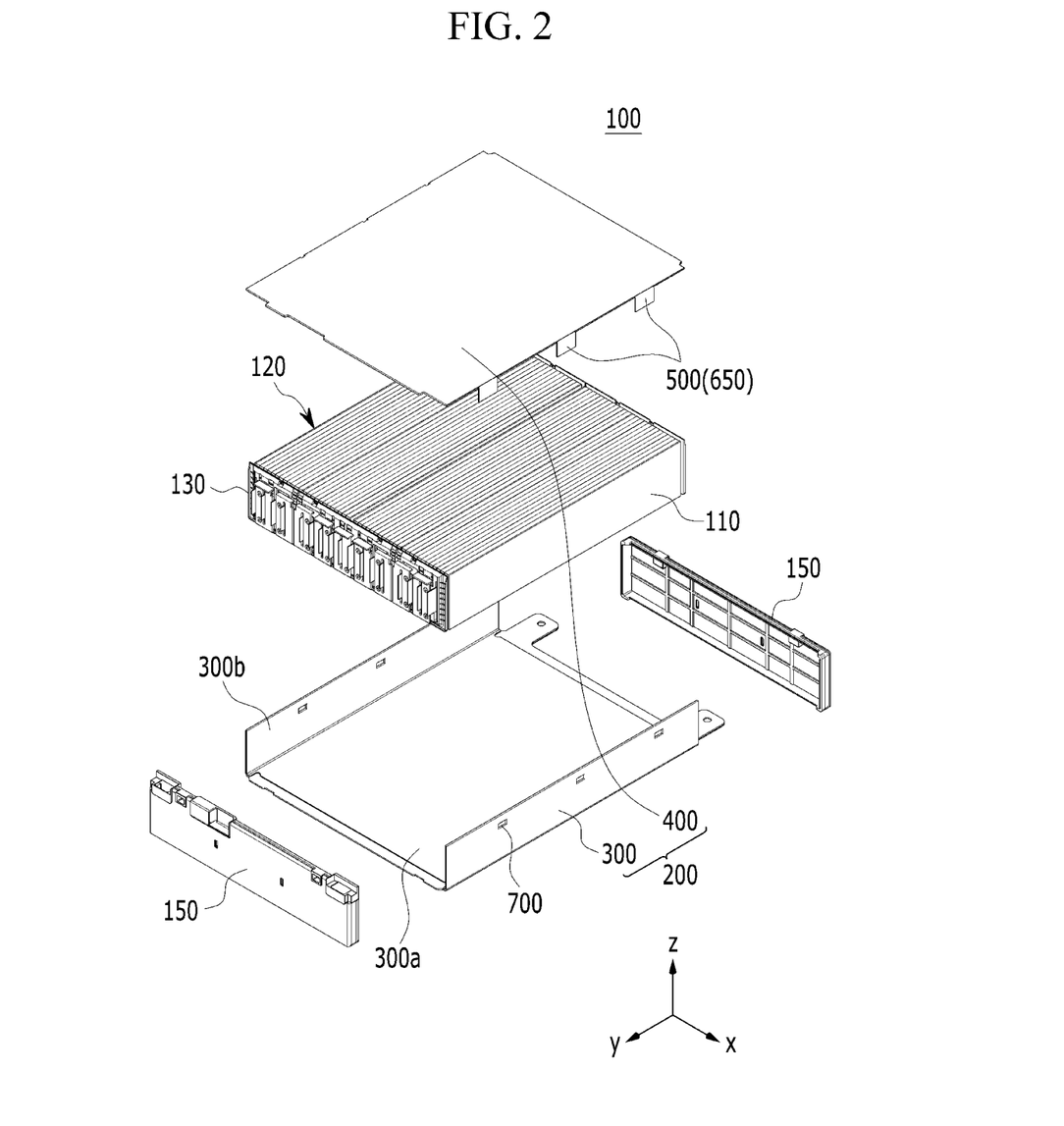
FIG. 2 is an exploded perspective view of a battery module according to an exemplary embodiment of the present invention.
Figure 3:
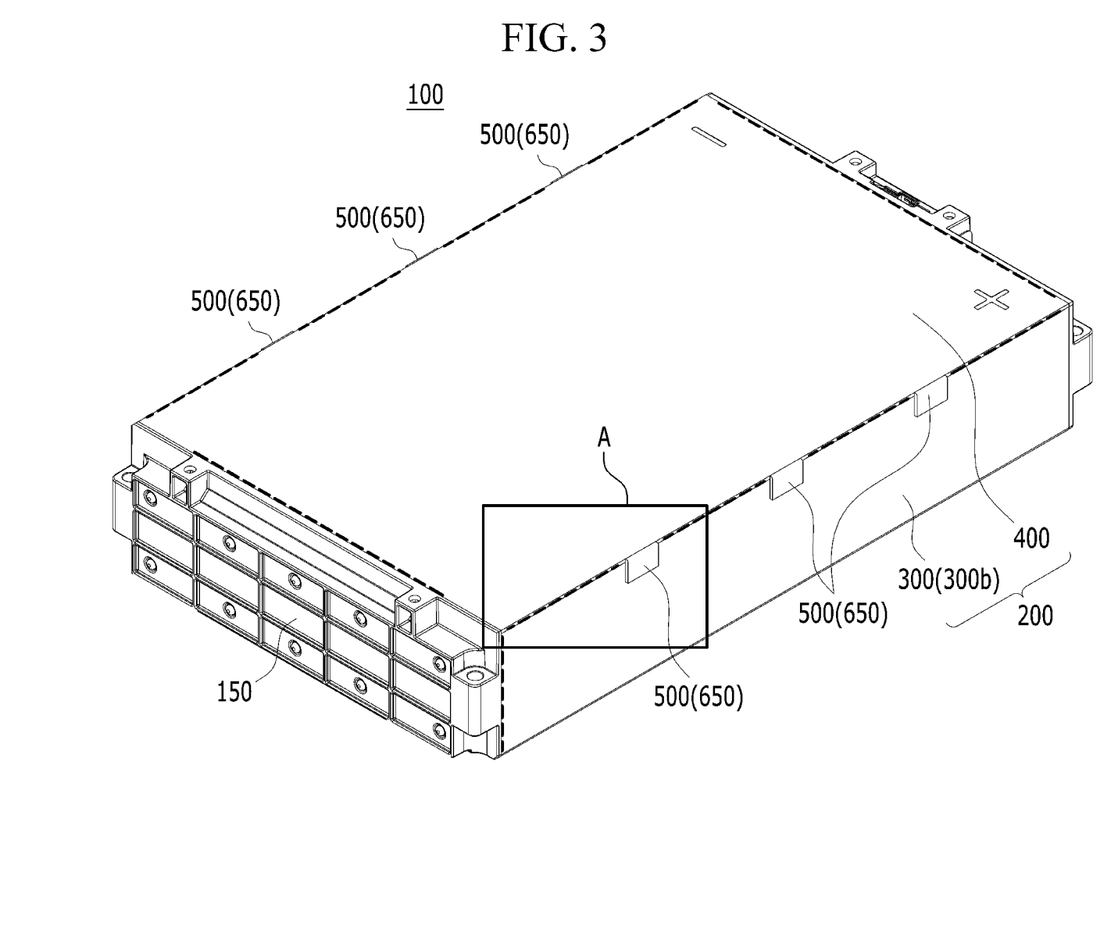
FIG. 3 is a perspective view of the battery module of FIG. 2, in which all components of the battery module have been assembled.

FIG. 2 is an exploded perspective view of a battery module according to an exemplary embodiment of the present invention. FIG. 3 is a perspective view of the battery module of FIG. 2 in which the constituent elements have been assembled.

As illustrated in FIG. 2 and FIG. 3, the battery module 100 includes a cell assembly 120 that includes a cell assembly (battery cell stack) 120 in which a plurality of battery cells 110 are stacked, a housing 200 that surrounds the cell assembly 120, and an end plate 150 that covers front and rear surfaces of the cell assembly 120. In addition, the battery module 100 further includes a bus bar frame 130 positioned between the end plate 150 and the cell assembly 120.

The battery cell 110 is a rechargeable battery and may be formed as a pouch-type rechargeable battery. A plurality of such battery cells 110 may be provided, and the plurality of battery cells 110 may be mutually stacked to be electrically connected to each other to form the cell assembly 120. The plurality of battery cells 110 may include electrode leads protruding from an electrode assembly, a battery case, and an electrode assembly, respectively.

The housing 200 includes a frame member 300, with openings in an upper surface and a rear surface thereof, thereby covering a lower surface and lateral surfaces of the cell assembly 120, and an upper plate 400 that covers an upper portion of the cell assembly 120. However, the housing 200 is not limited thereto, and may be replaced with a frame of another shape such as a mono frame surrounding the cell assembly 120, excluding the L-shaped frame or front and rear surfaces. The housing 200 may physically protect the cell assembly 120 accommodated in the housing 200.

The frame member 300 may include a bottom portion 300a that supports a lower portion of the cell assembly 120 and side portions 300b that extend upward from opposite ends of the bottom portion 300a.

The upper plate 400 may cover the open upper side of the housing 200. The end plate 150 may cover the front and rear surfaces of the cell assembly 120. The end plate 150 may be joined with front and rear edges of the upper plate 400 and the front and rear edges of the housing 200 through welding.

A plurality of bus bars mounted to the bus bar frame 130 may protrude from the battery cells and thus may contact electrode leads mounted on the bus bar frame 130.

However, the battery module 100 according to the embodiment of the present invention includes a large area module in which the cell assembly 120 includes a relatively large number of battery cells compared to a conventional battery module, and the module may have a relatively long horizontal directional length. Here, the horizontal directional length of the battery module may imply a length in which the battery cells are stacked.

Conventionally, upper ends of the side surfaces and the upper plate of the module are combined by welding, and particularly, for the large area module, tolerance of the housing increases as the structure of the battery module becomes larger, and assembly and welding becomes more difficult, thereby causing deterioration in assembly and productivity.

Thus, according to the present embodiment, to improve assembly and productivity of the upper plate 400 and the frame member 300, as illustrated in FIG. 3, a first fixing portion (shown as a dotted line) and a second fixing portion 500 having different coupling shapes are formed at the edges of the upper plate 400 coupled with the frame member 300. The first fixing portion may be a welding portion, and the second fixing portion 500 may be in the form of a hook or a screw. By forming the second fixing portion 500 at one edge of the upper plate 400 to assemble the upper plate 400 and the frame member 300, assembly of the battery module can be improved compared to a conventional battery module that only uses welding to assemble an upper plate and a frame member.

Hereinafter, the second fixing portion formed in the battery module according to the embodiment of the present invention will be described in detail.

Figure 4:
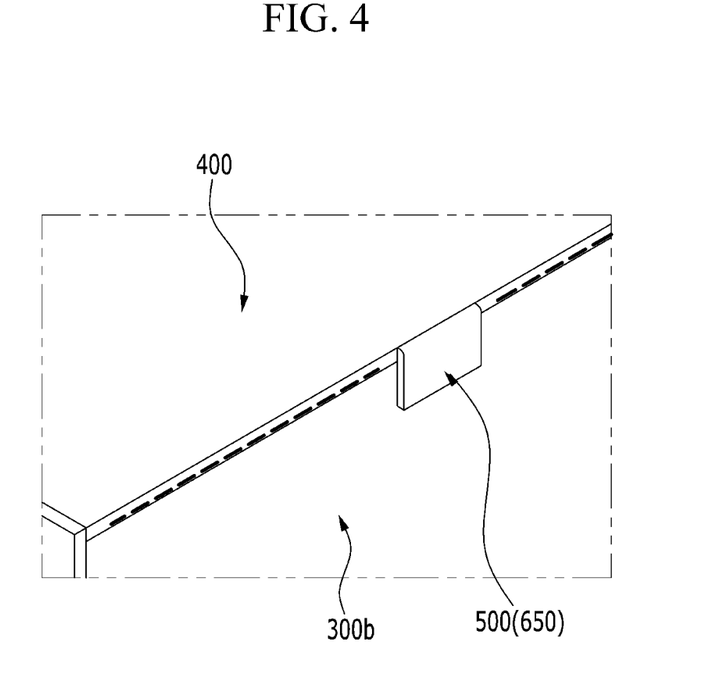
FIG. 4 is an enlarged view of part A of FIG. 3, and illustrates the battery module fastened with the second fixing portion according to the exemplary embodiment of the present invention.
Figure 5:
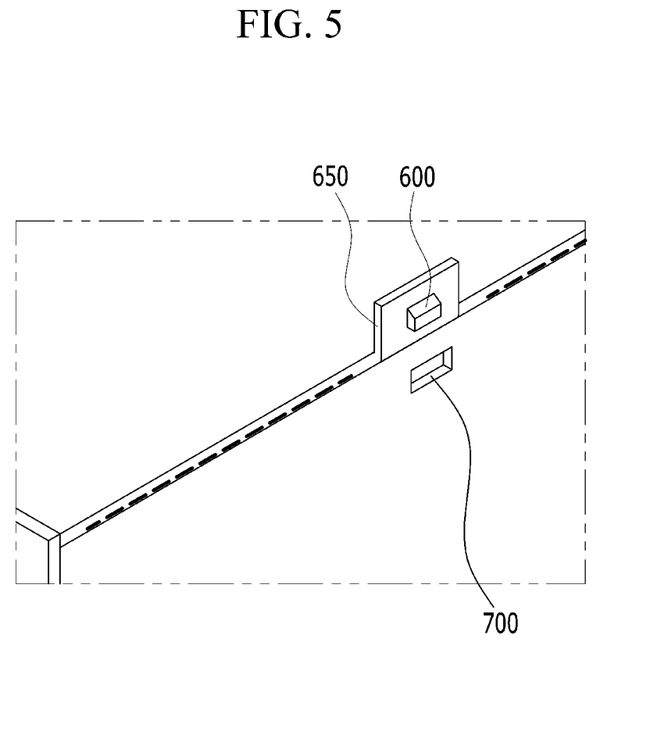
FIG. 5 is an enlarged view of part A of FIG. 4, when the second fixing portion is not fastened.
Figure 6:
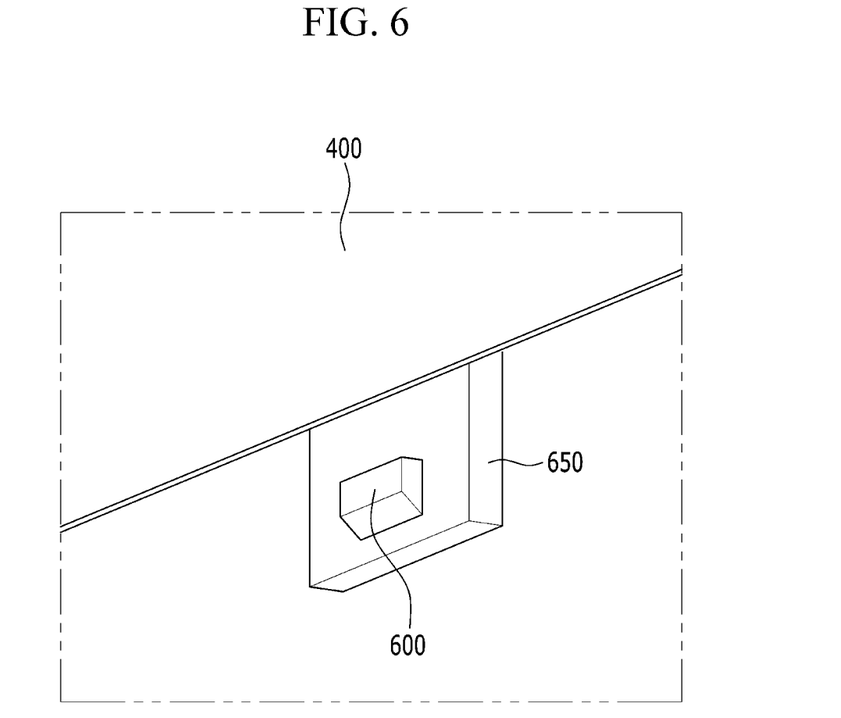
FIG. 6 is an illustration of the second fixing portion of the battery module viewed from the inside of the housing according to an exemplary embodiment of the present invention.
Figure 7:
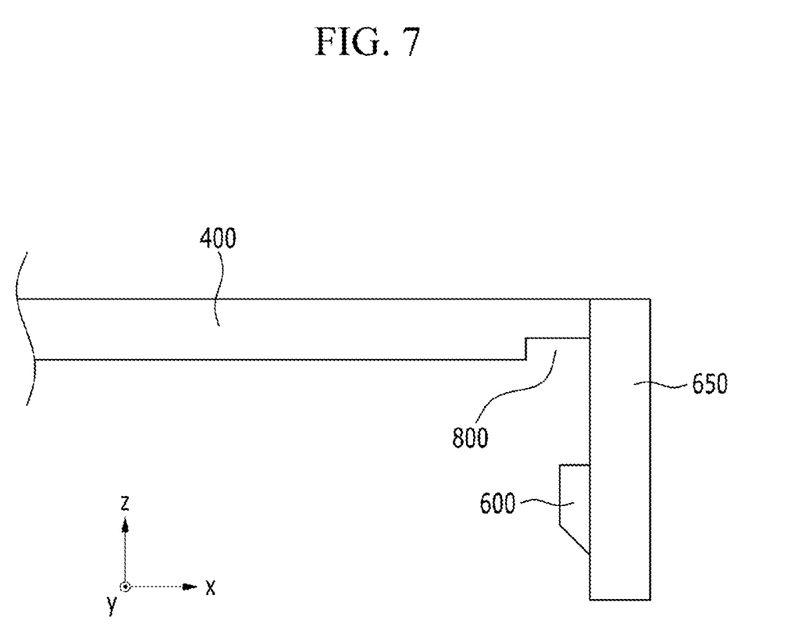
FIG. 7 is a side view of the second fixing portion of the battery module according to an exemplary embodiment of the present invention.

FIG. 4 is an enlarged view of part A of FIG. 3, and shows the battery module fastened with the second fixing portion according to the embodiment of the present invention. FIG. 5 is an illustration of the second fixing portion of FIG. 4 when it is not fastened. FIG. 6 illustrates the second fixing portion of the battery module as viewed from inside the housing according to the embodiment of the present invention. FIG. 7 is a side view of the second fixing portion of the battery module according to the embodiment of the present invention.

As illustrated in FIG. 4 to FIG. 7, the second fixing portion 500 includes a protruding portion 600, the protruding portion 600 is coupled to a hole 700 formed in the frame member 300, and a plurality of the second fixing portions 500 may be formed to be spaced apart from each other at the edges of the upper plate 400. The number of the second fixing portions 500 may be without limitation, but may be within a range in which assembly and productivity of the battery module according to the embodiment of the present invention are improved.

The upper plate 400 includes a fixing cover 650 extending from one edge of the upper plate 400 to cover the top of the side portion 300b, and the protruding portion 600 may be formed at an end of the fixing cover 650, where the end of the fixing cover corresponds to a lower portion of the fixing cover in a direction that extends away from the upper plate. The protruding portion 600 formed at the end of the fixing cover 650 may be coupled to the hole 700 to form the second fixing portion 500.

The protruding portion 600 may have a truncated cone shape having a surface in contact with the end of the fixing cover 650 as the bottom. The truncated cone may include a truncated circular cone and a truncated pyramid, and the truncated pyramid may include a quadrangular pyramid, a triangular pyramid, a pentagonal pyramid, and a polygonal truncated pyramid, but is not limited thereto, and may have various truncated shapes.

The surface of the protruding portion 600 contacting the end of the fixing cover 650 may be formed according to the shape of the truncated cone. Accordingly, the bottom surface of the protruding portion 600 may be a circle, an ellipse, a triangle, a quadrangle, a pentagon, and a polygon.

In particular, the protruding portion 600 in the present embodiment may have a trapezoid cross-section when viewed in a direction vertical to the end of the fixing cover 650 (viewed in a y-axis direction in FIG. 7), and may have a quadrangular truncated shape having the trapezoid cross-section. In addition, the bottom surface of the protruding portion 600, which is the surface of the protruding portion 600 in contact with the end of the fixing cover 650, may have a rectangular shape. However, this is only an example of the shape of the protruding portion 600, and the shape of the protruding portion 600 is not limited thereto.

The protruding portion 600 may be coupled to and fixed to the hole 700 formed in the frame member 300, and more specifically, the hole 700 may be formed in the side portion 300b of the frame member 300, and the protruding portion 600 may be coupled to and fixed to the hole 700. Accordingly, the hole 700 may be formed to have the same size and shape as the bottom surface of the protruding portion 600, which is a surface of the protruding portion 600 in contact with the end of the fixing cover 650, and the protruding portion 600 may be fitted and fixed to the hole 700.

The fixing cover 650 may be coupled from one edge of the upper plate 400 by a hinge (not shown) to cover the upper end of the side portion 300b, and the fixing cover 650 may be folded or unfolded by the hinge. When the fixing cover 650 is folded or unfolded, the protruding portion 600 is coupled to and fixed to the hole 700, and if necessary, the protruding portion 600 may be separated from the hole 700, but is not limited thereto.

The battery module 100 according to the embodiment of the present invention may include a groove portion 800 formed at the edge of the upper plate 400. As described above, the protruding portion 600 formed at the end of the fixing cover 650 may be fitted and fixed in the hole 700 formed in the side portion 300b of the frame member 300, and the groove portion 800 may be additionally formed to secure the fixing.

The groove portion 800 is formed at the edge of the upper plate 400, and the side portion 300b of the frame member 300 in which the hole 700 is formed can be inserted in the groove portion 800. The side portion 300b inserted into the groove portion 800 prevents separation of the fitted protruding portion 600 and the hole 700, thereby improving assembly of the battery module 100. Thereby, mutual coupling and assembling of the upper plate 400 and the housing 300 are secured through the second fixing portion 500, particularly the protruding portion 600 fitted into the hole 700, and the side portion 300b inserted into the groove portion 800.

The first fixing portion (welding; shown as a dotted line) may be formed between the plurality of second fixing portions 500. In addition, the end plate 150 and the housing 300 and the end plate 150 and the upper plate 400 may be coupled via the first fixing portion, respectively. Therefore, the first fixing portion (shown as a dotted line) and the second fixing portion 500 of the battery module simultaneously joins the upper plate 400, the housing 300, and the end plate 150, and thus it is possible to provide a battery module with improved assembly.

Figure 8:
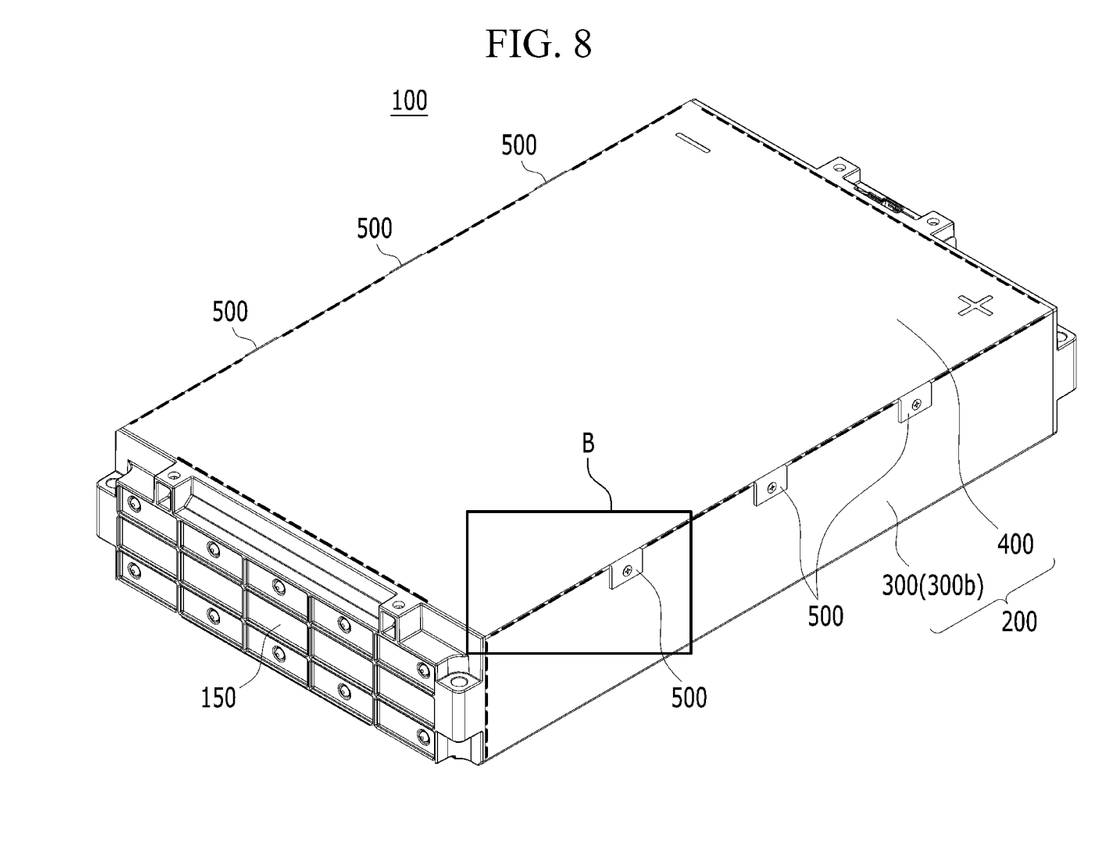
FIG. 8 is an illustration of a second fixing portion according to another exemplary embodiment of the present invention.
Figure 9:
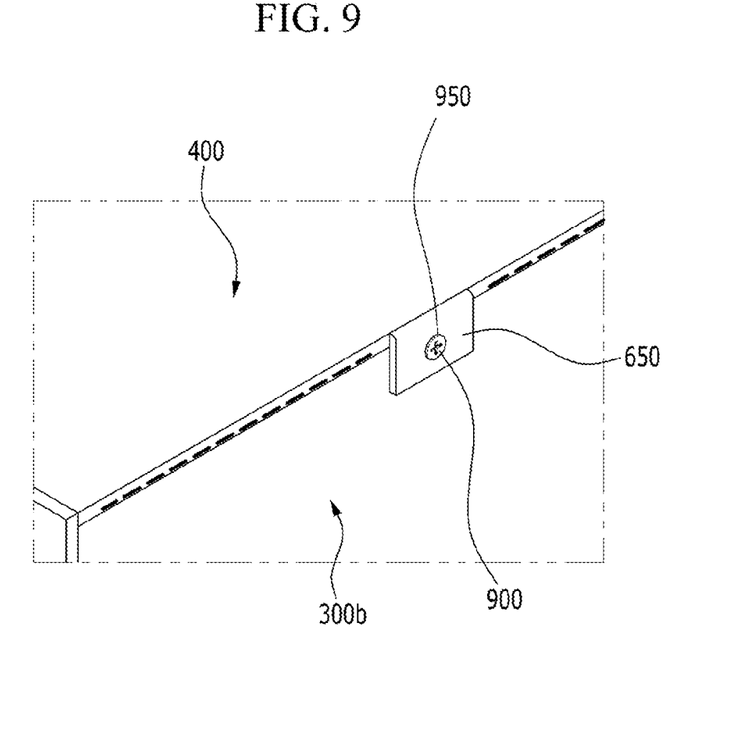
FIG. 9 is an enlarged view of part B of FIG. 8.

Hereinafter, a battery module including a first fixing portion and a second fixing portion according to another exemplary embodiment of the present invention will be described. Elements of the second fixing portion that are different from the previously described elements of the second fixing portion will be described.

FIG. 8 is an illustration of a second fixing portion according to another exemplary embodiment of the present invention. FIG. 9 is an enlarged view of part B of FIG. 8.

As illustrated in FIG. 8 and FIG. 9, a second fixing portion 500 according to another exemplary embodiment of the present invention may be formed in the shape of a screw. The screw-type second fixing portion 500 may include a screw nut portion (950) and a screw portion 900 fixed to the screw nut portion (950), and a plurality of second fixing portions 500 may be formed that are spaced apart from each other at the edges of an upper plate 400.

The upper plate 400 may further include a fixing cover 650 extending from one edge of the upper plate 400 to cover a top of a side portion 300b, and the screw nut portion (950) may be formed in the fixing cover 650. In addition, the screw nut portion (950) may also be formed in the side portion 300b. Accordingly, the second fixing portion 500 may be coupled to the side portion 300b through the fixing cover 650, and particularly, the screw portion 900 may be fixed by being fitted to the screw nut portion (950).

A first fixing portion (shown as a dotted line) may be formed between a plurality of second fixing portions 500. In addition, the end plate 150 and the housing 300 and the end plate 150 and the upper plate 400 can be coupled, respectively, by welding (shown as a dotted line). Therefore, the battery module in which the first fixing portion (shown as a dotted line) and the second fixing portion 500 according to the embodiment of the present invention are formed couples the upper plate 400, the housing 300, and the end plate 150 by welding, and thus it is possible to provide a battery module with improved assembly.

The battery module described above may be included in a battery pack. The battery pack may have a structure in which one or more battery modules according to the present embodiment are collected and a battery management system (BMS) that manages the temperature or voltage of the battery and a cooling device are added and packed.

The battery pack may be applied to various devices. Such a device may be applied to transportation means such as an electric bicycle, electric vehicle, hybrid vehicle, and the like, but the present invention is not limited thereto and is applicable to various devices that can use a battery module, which also belongs within the scope of the present invention.

In the above, a preferred embodiment of the present invention has been shown and described, but the present invention is not limited to the specific embodiment described above, and the present invention is capable of being implemented in numerous variations by a person of ordinary skill in the technical field to which the invention pertains without departing from the gist of the present invention claimed in the claimed range.

What is claimed is:

1. A battery module comprising:
a cell assembly including a battery cell stack comprising a plurality of battery cells;
a housing surrounding the cell assembly;
an end plate covering front and rear surfaces of the cell assembly,
a first fixing portion, and
at least one second fixing portion,
wherein the housing comprises a frame member covering a lower portion and side portions of the cell assembly, and an upper plate covering an upper portion of the cell assembly, and
wherein a coupling shape of the first fixing portion is different from a coupling shape of the at least one second fixing portion, and
wherein the first and second fixing portions are at edges of the upper plate.

2. The battery module of claim 1, wherein:
the first fixing portion is a welding portion, and the second fixing portion comprises a hook or a screw.

3. The battery module of claim 2, wherein:
the battery module comprises a plurality of second fixing portions,
each of the plurality of second fixing portions comprises a protruding portion on a bottom surface thereof,
the protruding portion is coupled to a hole in the frame member, and
the plurality of the second fixing portions are spaced apart from each other at the edges of the upper plate.

4. The battery module of claim 3, wherein:
the frame member comprises a bottom portion that supports the lower portion of the cell assembly and side portions that extend upward from the bottom portion of the frame member,
the upper plate further comprises a fixing cover that extends from one of the edges of the upper plate and covers a portion of an upper end of the corresponding side portion, and
the protruding portion of each of the plurality of second fixing portions is in contact with an end of the fixing cover.

5. The battery module of claim 4, wherein:
the protruding portion has a truncated shape, and a bottom surface of the protruding portion is in contact with the end of the fixing cover.

6. The battery module of claim 5, wherein:
the protruding portion has a quadrangular truncated shape with a trapezoid surface when viewed from a direction vertical to the end of the fixing cover.

7. The battery module of claim 6, wherein:
the bottom surface of the protruding portion in contact with the end of the fixing cover has a quadrangle shape.

8. The battery module of claim 4, wherein:
a size and a shape of the hole is the same as a size and a shape of the bottom surface of the protruding portion in contact with the end of the fixing cover, respectively, and
the protruding portion is fixed by fitting it into the hole.

9. The battery module of claim 8, wherein:
a groove portion is at an edge of the upper plate, and the corresponding side portion of the frame member is in the groove portion.

10. The battery module of claim 9, wherein
the first fixing portion is between the plurality of second fixing portions.

11. The battery module of claim 10, wherein
the end plate is welded to both the housing and the upper plate.

12. The battery module of claim 2, wherein:
the battery module comprises a plurality of second fixing portions,
each of the plurality of second fixing portions includes a screw nut portion and a screw portion fixed to the screw nut portion,
the plurality of the second fixing portions are spaced apart from each other at the edges of the upper plate.

13. The battery module of claim 12, wherein:
the frame member includes a bottom portion supporting the lower portion of the cell assembly, and side portions extending upward from opposite ends of the bottom portion of the frame member,
the upper plate further comprises a fixing cover extending from one of the edges of the upper plate to cover a portion of an upper end of the corresponding side portion,
the screw nut portion is in the fixing cover and the side portion, and
each of the plurality of second fixing portions is coupled with the corresponding side portion of the frame member through the fixing cover.

14. The battery module of claim 13, wherein
the screw portion is fixed into the screw nut portion.

15. A battery pack comprising the battery module of claim 1.

* * * * *